United States Patent [19]
Silkeberg et al.

[11] Patent Number: 6,033,706
[45] Date of Patent: Mar. 7, 2000

[54] REFINING OF EDIBLE OIL RETAINING MAXIMUM ANTIOXIDATIVE POTENCY

[75] Inventors: Alf Silkeberg, Altea, Spain; S. Parkash Kochhar, Reading, United Kingdom

[73] Assignee: Lipidia Holding S.A., Luxembourg-Kirchberg, Luxembourg

[21] Appl. No.: 09/088,395

[22] Filed: Jun. 1, 1998

Related U.S. Application Data

[63] Continuation-in-part of application No. 08/917,989, Aug. 25, 1997, abandoned, which is a continuation of application No. 08/588,524, Jan. 18, 1996, abandoned.
[60] Provisional application No. 60/006,389, Nov. 2, 1995, provisional application No. 60/006,990, Nov. 21, 1995, provisional application No. 60/007,736, Nov. 29, 1995, and provisional application No. 60/007,737, Nov. 29, 1995.

[30] Foreign Application Priority Data

Feb. 13, 1998 [EP] European Pat. Off. .............. 98102528

[51] Int. Cl.$^7$ ....................................................... A23D 9/02
[52] U.S. Cl. .............................. 426/417; 426/601; 554/9; 554/17; 554/22
[58] Field of Search .................................... 426/417, 601; 554/9, 22, 17

[56] References Cited

U.S. PATENT DOCUMENTS

| | | | |
|---|---|---|---|
| 4,049,686 | 9/1977 | Ringers | 260/424 |
| 4,089,880 | 5/1978 | Sullivan | 260/424 |
| 4,280,962 | 7/1981 | Watanabe | 260/424 |
| 4,363,823 | 12/1982 | Kimura | 426/542 |
| 4,584,141 | 4/1986 | Paulitz | 260/420 |
| 4,627,192 | 12/1986 | Fick . | |
| 4,743,402 | 5/1988 | Fick . | |
| 4,880,574 | 11/1989 | Welsh . | |
| 5,248,799 | 9/1993 | Schmutzler | 554/192 |
| 5,260,077 | 11/1993 | Carrick et al. . | |
| 5,290,579 | 3/1994 | Hitotsumatsu et al. | 426/489 |
| 5,514,398 | 5/1996 | Imai et al. . | |
| 5,514,405 | 5/1996 | Yokomichi et al. . | |
| 5,552,167 | 9/1996 | Taylor | 426/99 |
| 5,714,094 | 2/1998 | Bertholet | 426/417 |
| 5,744,145 | 4/1998 | Bertoli | 426/417 |

FOREIGN PATENT DOCUMENTS

| | | |
|---|---|---|
| 0477825 | 4/1992 | European Pat. Off. . |
| 1053807 | 4/1964 | United Kingdom . |

OTHER PUBLICATIONS

"Bailey's Industrial Oil and Fat Products" by Marvin W. Formo et al., vol. 1, Fourth Edition, 1979.

"Chemical Aspects of the Antioxidative Activity of Roasted Sesame Seed Oil, and the Effect of Using the Oil for Frying" by Yasuko Fukuda et al., Agric.Biol.Chem., 50(4). 587–862, 1986.

"Products from the Autoxidation of $\Delta^5$–Avenasterol" by Michael H. Gordon et al., Food Chemistry 14 (1984) 295–301.

"The Effect of Sterols on the Oxidation of Edible Oils" by Michael H. Gordon et al., Food Chemistry 10 (1983) 141–147.

"Plant Sterols as Natural Antipolymerisation Agents" by Michael H. Gordon, Department of Food Science & Technology, University of Reading. 1989.

"Sterol content of foods of plant origin", by John L. Weihrauch et al., Journal of The American Dietetic Association, vol. 73, Jul. 1978.

"The Role of Free Radicals and Antioxidants: How do we know that they are working?" by Michael J. Thomas, Critical Reviews in Food Science and Nutrition, 35(1&2): 21–39 (1995).

"Antioxidants: Tools for Preventing Lipid Oxidation" by James Giese, Associate Editor, Food Technology, Nov. 1996.

"Assessment of Potential Prooxidant and Antioxidant Actions[1]" by Okezie I. Aruoma, JAOCS, vol. 73, No. 12 (1996).

"Sesamin (a compound from sesame oil) Increases Tocopherol Levels in Rats Fed ad libitum" by Afaf Kamal–Eldin, et al., Lipids, vol. 30, No. 6 (1995).

"Effects of Sesame in the Senescence Accelerated Mouse" by Kanae Yamashita et al., vol. 43, No. 6, p. 445–449, 1990.

"SesameSeed Lignans and $\gamma$–Tocopherol Act Synergistically to Produce Vitamin E Activity in Rats[1,2]" by Kanae Yamashita et al., 1992 American Institute of Nutrition.

"Inhibition of cholesterol absorption and d synthesis in rats by sesamin" by Nobuaki Hirose et al., Journal of Lipid Research, vol. 32, 1991.

"Seed Oils of Sesamum indicum, L. and Some Wild Relatives a compositional Study of the Fatty Acids, Acyl Lipids, Sterols, Tocopherols and Lignans" by Afaf Kamal–Eldin et al., UPPSALA 1993.

"The Effects of Extraction Methods on Sesame Oil Stability" by Afaf Kamal–Eldin et al., JAOCS, vol. 72, No. 8 (1995).

"Effect of Selected Oat Sterols on the Deterioration of Heated Soybean Oil" by Pamela J. White et al., JAOCS, vol. 63. No. 4 (Apr. 1986).

"Modulation of Zymosan Stimulated Leukotriene Release by Dietary Unsaturated Fatty Acids" by J. Bruce German, et al., Prostaglandins Leukotrienes and Medicine, (1987) 30, 69–76.

(List continued on next page.)

*Primary Examiner*—Carolyn Paden
*Attorney, Agent, or Firm*—Jordan and Hamburg LLP

[57] ABSTRACT

Crude edible specialty oils, namely, sesame seed oil, rice bran oil, wheat germ oil, oat germ oil, coffee oil, tea seed oil, and pine seed oil are refined so as to minimize the destruction of antioxidants and antioxidant precursors naturally occurring in the crude oil. This specially processed or "dedicated" oil may be mixed, in small proportion, with a much less expensive edible "bulk" oil which has been conventionally refined. The mixture exhibits to a substantial extent the resistance of the dedicated oil to oxidation and polymerization.

35 Claims, No Drawings

OTHER PUBLICATIONS

"Influence of Sesame Lignang on Various Lipid Parameters in Rats" by Michihiro Sugano et al., Agric. Biol. Chem., 54 (10) 2669–2673, 1990.

"Essential Fatty Acids, Prostaglandins and Leukotrienes" by Ralph T. Holman. Progress in Lipid Research, vol. 25, 1986.

"Sterol Additives as Polymerization Inhibitors for Frying Oils" by R.J. Sims et al., Journal of the American Oil Chemists' Society.

"Some Factors in the Chinese Diet Affecting Carotene Utilization" by Te–Ch'in Chou et al., Department of Foods and Nutrition, School of Home Economics, Kanas State College, Manhattan.

"Variation in Fatty Acid Composition of the Different Acyl Lipids in Seed Oils from Four Sesamum Species" by Afaf Kamal–Eldin et al., Dept. of Food Hygiene, Swedish University of Agricultural Sciences.

"Thermal stability of blended oils having sesame oil" by R.H.H. Millwalla et al., JOTA Jul.–Sep. 1986, 17 (3) 87–89.

"Effects of Sesame Seed and Oil Processing on the Quality of Sesame Oil" by Dr. Afaf Kamal–Eldin, Dept. of Food Science, Swedish University of Agric. Sciences.

"In search of better methods to evaluate natural antioxidants and oxidative stabiltiy in food lipids" by E.N. Frankel. Trends in Foods Science & Technology Jul. 1993 (Vo. 4).

Technical Note—"Thermal Stability of Sesame/Soybean Oil Blends", Food Chemistry 41 (1991) 355–360.

"Chemical, Nutritional and Toxicological Studies of Rice Bran Oil" by C. Rukmini, Food Chemistry 30 (1988) 257–268.

REFINING OF EDIBLE OIL RETAINING MAXIMUM ANTIOXIDATIVE POTENCY

REFERENCE TO RELATED APPLICATIONS

This is a continuation-in-part of U.S. patent application Ser. No. 917,989, filed Aug. 25, 1997, now abandoned which, in turn, is a continuation of U.S. patent application Ser. No. 588,524, filed Jan. 18, 1996, now abandoned which, in turn, claims the benefit of U.S. provisional patent applications Ser. No. 60/006,389, filed Nov. 2, 1995, Ser. No. 60/006,990, filed Nov. 21, 1995, and Ser. Nos. 60/007,736 and 60/007,737, filed Nov. 29, 1995.

BACKGROUND OF THE INVENTION

This invention relates to a process for refining edible oil to retain maximum antioxidative potency, the resultant refined edible oil and mixtures of that oil with other edible oils.

Fats and oils (oils are just liquid fats) are stable food products, because they contain virtually no water, and, thus, microorganisms cannot thrive or grow in them. However, they do react with water and/or oxygen and under influence of light, trace metal ions such as iron, copper and other metal ions, resulting in off-odors and bad flavor, known as rancidity. The rapidity of the onset of rancidity is much greater at high temperature (as the ones used in preparation of food). Each oil has its own stability, which varies with two factors:

a) One factor is the ratio in the oil of saturated fatty acids to unsaturated fatty acids. There are two types of unsaturated fatty acids: monounsaturated and polyunsaturated. The saturated fatty acids are the least vulnerable and the polyunsaturated the most vulnerable to degradation.

b) The other factor is the content and effectiveness of antioxidants and antioxidant precursors naturally occurring in the oil. Antioxidants are compounds that react with free radicals and inhibit free radical chain reaction. Oil seeds or other raw material for oil may, apart from actual antioxidants, contain compounds that are not per se antioxidants (which do not interfere with free radical formation) but the chemical structure of which may under certain circumstances change into actual antioxidants. These compounds are called "antioxidant precursors".

It is common to add synthetic antioxidants such as butylated hydroxy anisole (BHA), butylated hydroxy toluene (BHT), propyl gallate and tertiary butyl hydroxy quinone (TBHQ) to oils. They are mainly used to inhibit oxidation during the storage of oil. They are too unstable to have any useful function if the oil is used for frying. Also, there is among the public a growing concern that synthetic chemicals may not be safe and synthetic material in food is often mentioned in connection with allergic reactions.

It is an object of the invention to provide a process for refining crude edible oil so that an unusually high degree of naturally occurring antioxidative power is retained in the refined oil.

It is a further object of the invention to provide a refined edible oil having an unusually high degree of naturally occurring antioxidative power.

It is a yet further object of the present invention to provide a refined edible oil selected from the group consisting of sesame seed oil, rice bran oil, wheat germ oil, oat germ oil, coffee oil, tea seed oil, pine seed oil and mixtures of any of the foregoing containing at least about 50%, by weight, preferably at least about 60%, by weight, and most preferably, at least about 75%, by weight, of the antioxidants and antioxidant precursors naturally occurring in the crude edible oil, considered cumulatively.

Other objects and advantages of the invention will be apparent from the following description of the invention.

SUMMARY OF THE INVENTION

The antioxidant and antioxidant precursor contents of crude oil are to some extent dependent on the extraction method; the oil is extracted either by solvents or by expelling (physical pressure). Crude oil often is high in antioxidative power, "antioxidative power" or "antioxidative potency" referring to the total content of antioxidants and antioxidant precursors. The crude oil also contains a number of undesired substances such as water, free fatty acids, phospholipids, metal traces, discoloration agents and, often, pesticide residues. These substances have to be removed in a process called "refining." There are two types of refining, a chemical process and a physical process. Both processes not only remove the unwanted substances, but, because the refining requires very active chemicals and some stages are performed at very high temperatures, also vitamins, antioxidants and antioxidant precursors are removed, decreased or partially destroyed at the same time.

There are several reasons why it is highly desirable to retain maximum antioxidative power in the refined oil. During degradation of organic compounds free radicals are formed. Free radicals in vivo influence the rate of degradation and senescence of the cells and may cause damage to DNA. During storage of food containing oil, free radicals are formed, giving off-flavor and off-odor to the food; during deep-fat frying of food the free radical formation is accelerated, initiating an autoxidative chain reaction. The degraded oil gets darker, starts foaming, and develops an off-odor and forms polymers and becomes highly viscous; the oil must be discarded. The reaction with antioxidants yields unreactive radicals that delay or inhibit propagation or the chain reaction; antioxidants, thus, reduce the threats posed by the free radicals, including inhibiting or delaying polymerization of unsaturated oils which would otherwise occur when the unsaturated oils are heated in air to high temperatures.

The present invention provides, inter alia, refining processes that retain maximum antioxidative power in the refined oil. The refining processes of the invention may be said to be "dedicated" refining processes and the refined oil may be said to be "dedicated" because the refining processes of the invention are dedicated to the purpose of maximizing the retention of antioxidative power during the refining. Oil seeds and other raw material for oils generally contain antioxidants and sometimes antioxidative precursors which may be transformed to antioxidants when subjected to certain conditions, for example when heated as they are used for cooking, or in vivo, i.e., after being ingested. The same transformation of the precursors to active compounds, i.e., antioxidants, can also happen if oil containing antioxidant precursors is mixed with acids, such as when blending the oil with vinegar for salad dressing or mayonnaise or other foodstuff the recipe for which calls for vinegar, or other edible acid, and edible oil.

As in the case of other antioxidants naturally occurring in edible oils, the content of tocopherols also is reduced by conventional refining. One type of tocopherol ($\gamma$-tocopherol) is more stable than the other types. Certain crude speciality oils, as for example sesame oil, rice bran oil, oat germ oil, wheat germ oil, coffee oil, tea seed oil and pine seed oil contain potent antioxidants and antioxidant precursors. Sesame seeds contain a unique compound, called "sesamolin." Rice brans contain a unique mixture of ferulic acid esters of sterols and triterpene alcohols called "oryzanol." Both sesame seeds and rice brans are rich not only in γ-tocopherol, but also in Δ-5 and Δ-7 avenasterol. These sterols contain ethylidene side-chains in high concentration which, if present in the refined oil, act as polymerization inhibitors, which is very useful in frying applications. However, in usual refining the content of these antioxidants and antioxidant precursors are significantly reduced; in some cases they distill or transform into less desirable components. Even if it would be possible to extract some of the antioxidants and antioxidant precursors or manufacture them synthetically, under present regulations they would not be permitted as additives in oil for human consumption. According to the present invention, crude edible specialty oils are refined in such a way as to retain a rich natural content of these compounds. The oils can then be used as a constituent, to be blended with any bulk oil. There is a synergistic effect, meaning that even a small amount of constituent can have a substantial antioxidative effect on the blend. The expression "specialty oils" is used herein to mean certain oils having greater or more effective antioxidant and antioxidant precursor contents than other oils, the specialty oils being sesame oil, rice bran oil, oat germ oil, wheat germ oil, coffee oil, tea seed oil and pine seed oil and mixtures of any of the foregoing. The expression "bulk oils" means other oils, namely, soybean oil, palm oil, rapeseed (canola) oil, sunflower oil, corn (maize) oil, cottonseed oil, peanut oil, coconut oil, safflower oil and grapeseed oil and mixtures of any of the foregoing.

DETAILED DESCRIPTION OF THE INVENTION

There are in principle two types of oil refining, chemical (caustic) refining and physical (steam) refining. State-of-the-art processes for both chemical and physical refining are described in *Bailey's Industrial Oil and Fat Products*, Fifth Edition, Vol.4, Chapters 3 and 6 (1996). Conventional physical refining is effected under vacuum at 250–270° C. There is a great loss of antioxidants and antioxidant precursors, considered cumulatively, under such harsh conditions and conventional physical refining therefore is not suitable for the purpose of the present invention. The purpose of all refining is to remove undesired components, such as last traces of solvents (for solvent extracted oils), suspended solid particles, colorants and free fatty acids and to remove undesired flavors and odors, metal traces and pesticide residues. The usual steps in conventional chemical refining are:

1. Degumming
2. Neutralization
3. Bleaching
4. Deodorization

Each of these steps is modified for the purpose of the present invention. Refining according to the present invention can most conveniently be described by first describing conventional chemical refining and then describing modifications called for by the present invention. Conventional chemical refining is described as follows:

1. Degumming is generally carried out using 1%–3% by weight water or aqueous solution of phosphoric acid based on the weight of the oil, and heating at 60° C.–85° C. for 10 to 30 minutes. The process removes the bulk of phospholipids or "gums" and proteinaceous matter and reduces color components and trace metals.

2. The neutralization involves the addition of dilute alkali to remove free fatty acids from the oil. The acids are converted to soaps, which are removed by centrifugation, decantation or running off the soap stock from the bottom of the vessel. Neutralization conditions vary: contact time 2 to 15 minutes and temperature 70° C. to 95° C., depending on batch or continuous process. The oil is then subjected to hot water washings to remove most of the soaps and the oil is then dried under vacuum.

3. The primary object of bleaching of the neutral oil is to remove major portions of colored substances present. Traditionally, alkaline or acid natural clays have been used; recently, acid-activated clays are most common. All the aforementioned clays, known generically as "bleaching earth," tend to efficiently absorb color components. Bleaching earth not only removes color pigments but also trace metals and any residual soaps remaining from the neutralization process. The removing of trace metals is important as such components act as catalysts for free radicals. Normal bleaching conditions can be 0.5 to 2% by weight activated bleaching earth, based on the weight of the oil, the temperature 90° to 110° C., contact time 15 to 30 minutes and pressure 20–50 mbar. Thermal bleaching, i.e., bleaching without the aid of bleaching earth, conditions can be 240–260° C., the time 45 to 120 minutes and pressure 1–6 mbar.

4. Deodorization, the last refining stage, is employed to remove off-flavor components, including residual free fatty acids, mono- and diglycerides and any color decomposition products. Deodorization conditions are: temperature 210–270° C. and holding time 3–8 hours for batch process and 15 to 120 minutes for continuous and/or semi-continuous deodorization. The steam consumption is 5 to 10% by weight, based on the weight of the oil, in batch, and 1 to 3% by weight, based on the weight of the oil, in continuous/semi-continuous deodorization. The pressure is 1–6 mbar. The traditional refining steps not only remove undesired compounds; they also remove or considerably reduce the content of a large number of desired components such as natural antioxidants, antioxidant precursors, polymerization inhibitors and vitamins. Part of the desired components may still be present before the last conventional refining step, deodorization, but then decrease substantially or disappear due to the high temperatures used in the deodorization process.

The modifications of the traditional refining to effect the "dedicated" refining process, subject of the present invention, are described below:

1. Screening for Suitable Raw Material

Screening for good raw material is a standard procedure. However, the screening heretofore has been made with criteria in mind other than the antioxidative potency. It is preferable according to the present invention that the raw material (seeds, kernels, fruits and the like) be selected on the basis of having at least typical antioxidative potency (i.e., antioxidants and antioxidants precursors content) and, most preferably, on the basis of having maximum or especially high antioxidative potency. It is also preferable according to the present invention that seeds, kernels, fruits and the like with higher than average amounts of undesired components such as chlorophyll and free fatty acids be avoided. The raw material should preferably be virtually free of pesticide residues. The reason is that conditions necessary for removal of the pesticide residues in the refining process would simultaneously harm the antioxidative potency.

2. Extraction

Solvent extraction is preferred according to the present invention because it has been found to yield the highest content of antioxidants and antioxidant precursors, depending on the choice of solvent. The choice of solvent is critical and $C_1$ to $C_4$ alcohols are preferred as solvents. When it comes to physical expelling of oil out of the seeds or other raw materials for oils, namely, brans, kernels or fruit, it is generally done in two steps. The conventional wisdom is that the first press yields a better quality and it is often advertised on the labels of speciality oils, sold at retail, that the oil is from "the first press." The opposite is the case, when it comes to the presence of antioxidants. For example, the antioxidants are most abundant near the hull, where they are most useful to protect the seeds on the plant, and the second press extracts oil that is nearer to the surface of the seed and yields a higher amount of antioxidants. The oil from the second press is, therefore, preferred, according to the present invention, when physical expelling is employed. Generally, however, if physical expelling of the oil is used in the practice of the present invention, the oil from both pressings is blended and used for reasons of economy.

3. Degumming

Phospholipids and other unwanted components such as proteinaceous material ("gums") are removed. In the "dedicated" method the degumming of the oil is effected by mixing the oil with a quantity of aqueous solution of citric acid (preferably of 10 to 20% by weight citric acid concentration, based on the weight of the solution) such that the mixture contains about 50 to about 500 mg of citric acid per kg of crude oil, the mixture being held at about 30 to about 50° C. for about 15 to about 20 minutes under an inert gas, typically nitrogen, blanket. The temperature of the resultant degummed oil containing solids is then raised to within the range of about 65 to about 75° C., preferably to about 70° C., and the degummed oil containing solids is centrifuged thereby to remove the solids from the degummed oil.

4. Neutralization

The degummed oil is neutralized by mixing it with an aqueous solution of NaOH, preferably at a concentration of about 2 to about 3N, preferably at about 90 to about 95° C. and preferably in continuous short-mix processing equipment. The neutralized oil is then centrifuged. Depending upon the free fatty acid content, a single or no hot water wash is given in order to retain sensitive components such as oryzanol and $A\Delta 5$ avenasterol. The oil is dried, preferably under vacuum at about 90 to about 95° C.

5. Bleaching

During traditional bleaching of sesame oil, essentially all the sesamolin remaining at that point is converted into antioxidants, namely, sesamol, sesaminol and epi-sesaminol. This conversion of antioxidant precursors to antioxidants has in the prior art been regarded as an advantage. The present invention is to the contrary. According to the present invention, at least a substantial proportion of the precursor is, by dedicated bleaching as described below, left unconverted and only converted into the antioxidants when needed, for example in vivo or when activated with the acidity in vinegar for the manufacture of mayonnaise or for salad dressing or for other foodstuff including edible oil and edible acid, such as vinegar, or during deep-frying. The gradual conversion during frying imparts a substantially increased stability to the oil.

In the "dedicated" bleaching process about 0.1% to about 2%, by weight, amorphous silica gel, based on the weight of the oil, and about 0.005 to about 0.02% citric acid, by weight, based on the weight of the oil, are added to the oil heated to a temperature of about 50 to about 90° C. and the thusly heated mixture of the oil with the amorphorus silica gel and the citric acid is retained under vacuum, preferably a pressure of about 10 to about 20 mbar, for about 15 to about 30 minutes. This treatment eliminates or minimizes the usual treatment with bleaching earth. The purpose is to remove traces of soap, phospholipids and trace metals. If necessary, some minor quantities of bleaching earth might be added to remove color components and peroxide decomposition products. The oil is then fast filtered to separate it from solids and cooled under an inert atmosphere, typically nitrogen.

Optionally, if additional bleaching seems necessary, a mixture of about 0.05 to about 0.2%, by weight, activated carbon, based on the weight of the oil, and about 0.1 to about 1% weakly acid bleaching clay (pH preferably about 5 to about 7), based on the weight of the oil, is added to the oil heated to a temperature of about 95 to about 100° C. and the thusly heated mixture of the oil with the activated carbon and weakly acid bleaching clay is retained under vacuum, preferably a pressure of about 5 to about 20 mbar, for about 20 to about 50 minutes. The bleached oil is fast filtered and cooled under an inert atmosphere, usually nitrogen.

These "dedicated" bleaching conditions bring about relatively little change or only desirable alterations in the antioxidant precursors and the related antioxidants. This is contrary to a total or almost total loss of a valuable component such as sesamolin in traditional refining. Even gamma-tocopherol, which is known as an effective antioxidant, is thus left virtually untouched, compared to a greater loss in the usual bleaching process.

6. Deodorization

Traditional deodorization would deplete the antioxidants and possibly remaining antioxidant precursors, and, therefore, is unacceptable for purposes of the present invention. Generally, the flavor and odor of the oil refined according to the dedicated process are very mild. As the refined oil usually is to be used mixed with bulk oil in a proportion of about 0.2 to about 10%, generally about 0.2 to about 5% or even less, by weight, the balance being the bulk oil, slightly stronger flavor and minor odor may be tolerated. However, if any unwanted flavoring or coloring is experienced, perhaps due to the raw material being of lower quality, or minor pesticide residues be detected, the unwanted components can be removed by inert gas deodorization under mild conditions. For example, the following process may be used and should be used if there is any uncertainty about a possible content of pesticide residues: The oil is subjected to inert gas deodorization by heating it to 120–150° C. with inert gas, usually nitrogen, flushing for about 1 to about 2 hours at a pressure of about 0.5 to about 2 mbar, temperature and pressure depending upon the degree of off-flavor/odor.

The table hereinbelow relates to the results of chemical refining of crude sesame oil by traditional refining and by dedicated refining according to the present invention as described hereinabove. The figures for the traditional refining are taken from Y. Fukuda et al., Chemical Aspects of the Antioxidate Activity of Roasted Sesame Seed Oil and the Effect of Using the Oil for *Frying, Agric. Biol. Chem.* 50 (4, pp 857–862)(1986). The dedicated refining is carried out as described above, for a batch of about 10,000 kgs of crude sesame oil.

The figures are given as mg/kg, i.e., mgs of the recited substance per kg of sesame oil. The figures by Fukuda et al. were originally given in mg/100 g and converted in this table for comparison.

LOSS OF ANTIOXIDATIVE COMPONENTS AT VARIOUS REFINING STEPS.

Comparison between traditional and "dedicated" refining (Sesamin and episesamin are not included in the table as they have not been shown to have any antioxidative function in vitro).

|  | mg/kg | | | | | |
| --- | --- | --- | --- | --- | --- | --- |
|  | Sesamolin | Sesamol | Sesaminol | Episesaminol | γ-tocopherol | Total |
| Traditional refining | | | | | | |
| Crude sesame seed oil | 5100 | 43 | 0 | 0 | 335 | 5478 |
| Neutralized and washed | 4248 | 7 | 0 | 0 | 226 | 4481 |
| After bleaching | 0 | 463 | 339 | 480 | 218 | 1500 |
| After deodorization | 0 | 17 | 284 | 343 | 184 | 828 |
| Dedicated refining | | | | | | |
| Crude sesame seed oil | 6188 | 2 | 10 | n.d. | 402 | 6602 |
| Neutralized and washed | 6092 | trace | trace | n.d. | 401 | 6493 |
| After bleaching | 3273 | 1781 | 71 | 36 | 398 | 5559 |
| After deodorization | 3160 | 1593 | 74 | 36 | 383 | 5246 | n.d. = not detected

These data on desirable components, determined after different stages of processing, clearly demonstrate the advantages of the dedicated refining versus traditional refining. In the dedicated process for sesame seed oil, more than 78%, by weight, of the original total of sesamolin, sesamol, sesaminol and episesaminol and more than 95%, by weight, of γ-tocopherol were retained. In contrast, using traditional refining, the losses were very high, e.g. only 12.5%, by weight, of the original total of sesamolin, sesaminol and episesaminol and 55%, by weight, of γ-tocopherol were retained in the refined oil.

A refined specialty edible oil according to the present invention, namely sesame seed oil, rice bran oil, wheat germ oil, oat germ oil, coffee oil, tea seed oil, pine seed oil and mixtures of any of the foregoing, contains at least about 50%, by weight, preferably at least about 60%, by weight, and most preferably at least about 75%, by weight, of the total antioxidants and antioxidant precursors naturally occurring in the crude edible oil.

Specialty oils are substantially more expensive than bulk oils. It is found that a mixture, namely about 0.2 to about 10%, generally about 0.2 to about 5% or even less, by weight, of a dedicated refined specialty oil of the present invention with the balance being a conventionally refined bulk oil, i.e., a bulk oil in which the refining process has resulted in significant depletion of any naturally occurring antioxidants and antioxidant precursors, will exhibit to a substantial extent all the advantages characteristic of the dedicated refined specialty oil itself. As used in the present specification and claims, the term "refined bulk oil" means conventionally refined bulk oil, i.e., refined bulk oil in which the refining process was not tailored to minimize the destruction of any antioxidants and antioxidant precursors naturally occurring in the crude bulk oil.

Foodstuffs prepared with an aforementioned mixture of dedicated refined specialty oil and conventionally refined bulk oil will, of course, contain the respective oils in the same proportions as in the mixture used to prepare the foodstuffs. The oil mixture may be used for frying a foodstuff to prepare a fried foodstuff such as French fried potatoes, dough foodstuffs such as doughnuts, deep-fried fish, deep-fried meat, deep-fried vegetables, potato chips, corn chips, and the like, or may be an ingredient of a foodstuff, such as salad dressings, mayonnaise, food dressings other than salad dressings or mayonnaise, in which an edible oil is an ingredient, butter substitutes such as margarine, ice cream and the like.

What we claim is:

1. A process for refining crude edible oil selected from the group consisting of sesame seed oil, rice bran oil, wheat germ oil, oat germ oil, coffee oil, tea seed oil, pine seed oil, and mixtures of any of the foregoing, said crude edible oil being resistant to oxidation, so that the resultant refined edible oil substantially retains the resistance to oxidation of the crude edible oil, comprising:

(a) degumming the crude oil by mixing said crude oil with an aqueous solution of citric acid in a weight ratio of the solution to said crude oil such that the mixture contains about 50 to about 500 mg of citric acid per kg of said crude oil, the temperature of the mixture being about 30 to about 50° C., then raising the temperature of the mixture to within the range of about 65 to about 75° C. and centrifuging the resultant degummed oil containing solids which have been formed by said degumming thereby to separate and remove the solids from said degummed oil, (b) neutralizing the degummed oil by mixing it with an aqueous NaOH solution, centrifuging the mixture to separate the oil from soaps formed by the neutralization, subjecting the separated oil to no more than a single hot water wash and drying the oil under vacuum to remove residual moisture therefrom, and (c) bleaching the neutralized, degummed oil by heating said oil to a temperature of about 50 to about 90° C. and adding to said heated oil about 0.1% to about 2%, by weight, amorphous silica gel, based on the weight of the oil, and about 0.005 to about 0.02%, by weight, citric acid, based on the weight of the oil, retaining the thusly heated mixture of the oil with the amorphous silica gel and the citric acid under vacuum for about 15 to about 30 minutes, and filtering the oil to separate it from solids.

2. Refined edible oil which is the product of the process of claim 1, is selected from the group consisting of sesame seed oil and rice bran oil and Mixtures of the foregoing and contains at least about 50% by weight of the total antioxidants and antioxidant precursors naturally occurring in the corresponding crude edible oil which has been refined by said process.

3. A mixture of refined edible oil according to claim 2 and at least one refined bulk edible oil selected from the group consisting of soybean oil, palm oil, rapeseed oil, sunflower oil, corn oil, cottonseed oil, peanut oil, coconut oil, safflower oil and grapeseed oil.

4. A mixture consisting essentially of about 0.2 to about 10%, by weight, of a refined edible oil according to claim 2 and the balance at least one oil selected from the group consisting of soybean oil, palm oil, rapeseed oil, sunflower oil, corn oil, cottonseed oil, peanut oil, coconut oil, safflower oil and grapeseed oil.

5. A butter substitute containing an oil mixture according to claim 4.

6. Margarine containing an oil mixture according to claim 4.

7. A food dressing containing an oil mixture according to claim 4.

8. Salad dressing containing an oil mixture according to claim 4.

9. Mayonnaise containing an oil mixture according to claim 4.

10. Potato chips containing an oil mixture according to claim 4.

11. Corn chips containing an oil mixture according to claim 4.

12. French fried potatoes containing an oil mixture according to claim 4.

13. Deep-fried fish containing an oil mixture according to claim 4.

14. Deep-fried meat containing an oil mixture according to claim 4.

15. Deep-fried vegetables containing an oil mixture according to claim 4.

16. Deep-fried dough foodstuff containing an oil mixture according to claim 4.

17. Ice cream containing an oil mixture according to claim 4.

18. A foodstuff containing an oil mixture according to claim 4.

19. A refined edible oil selected from the group consisting of sesame seed oil and rice bran oil and mixtures of the foregoing, said refined edible oil having been prepared from the corresponding crude edible oil, said refined edible oil containing at least about 50% by weight of the naturally occurring antioxidants and antioxidant precursors which were present in said corresponding crude edible oil prior to the refining.

20. A mixture of refined edible oil according to claim 19 and at least one refined bulk edible oil selected from the group consisting of soybean oil, palm oil, rapeseed oil, sunflower oil, corn oil, cottonseed oil, peanut oil, coconut oil, safflower oil, grapeseed oil, and mixtures of any of the foregoing refined bulk edible oils.

21. A mixture consisting essentially of about 0.2 to about 10%, by weight, of a refined edible oil according to claim 19 and the balance at least one oil selected from the group consisting of soybean oil, palm oil, rapeseed oil, sunflower oil, corn oil, cottonseed oil, peanut oil, coconut oil, safflower oil and grapeseed oil.

22. A butter substitute containing an oil mixture according to claim 21.

23. Margarine containing an oil mixture according to claim 21.

24. A food dressing containing an oil mixture according to claim 21.

25. Salad dressing containing an oil mixture according to claim 21.

26. Mayonnaise containing an oil mixture according to claim 21.

27. Potato chips containing an oil mixture according to claim 21.

28. Corn chips containing an oil mixture according to claim 21.

29. French fried potatoes containing an oil mixture according to claim 21.

30. Deep-fried fish containing an oil mixture according to claim 21.

31. Deep-fried meat containing an oil mixture according to claim 21.

32. Deep-fried vegetables containing an oil mixture according to claim 21.

33. Deep-fried dough foodstuff containing an oil mixture according to claim 21.

34. Ice cream containing an oil mixture according to claim 21.

35. A foodstuff containing an oil mixture according to claim 21.

* * * * *